May 23, 1933.  W. L. SCRIBNER  1,910,184

SELF ALIGNING ROLLER BEARING

Filed June 7, 1930

INVENTOR
William L. Scribner,
by Carr & Gravely,
HIS ATTORNEYS

Patented May 23, 1933

1,910,184

UNITED STATES PATENT OFFICE

WILLIAM L. SCRIBNER, OF CANTON, OHIO, ASSIGNOR TO THE TIMKEN ROLLER BEARING COMPANY, OF CANTON, OHIO, A CORPORATION OF OHIO

SELF-ALIGNING ROLLER BEARING

Application filed June 7, 1930. Serial No. 459,761.

My invention relates to roller bearings of the self aligning type, that is bearings in which the bearing parts are permitted to accommodate themselves to movements of the members in which they are mounted without interfering with the proper functioning and easy running of the bearing. The invention has for its prinicipal object a self aligning bearing that is easily manufactured, that has self aligning features without the line or surface contact usually existing between the rollers and race members of such bearings and that permits relative movement of the inner race member with respect to the rollers and outer race member.

The invention consists principally in a bearing having rollers that taper from each end toward the middle and convexly curved bearing members each engaging both tapering portions of said rollers. The invention further consists in a self aligning bearing in which the race members make point contact with the two tapering portions of the rollers, the points of contact of one race member being differently situated lengthwise of the roller from the points of contact of the other race member. The invention further consists in the self aligning bearing and in the parts and combinations and arrangements of parts hereinafter described and claimed.

In the accompanying drawing wherein like numerals refer to like parts wherever they occur, Fig. 1 is a half sectional view of a roller bearing embodying my invention, the rollers being arranged with their axes parallel to the axis of the bearing, Fig. 2 is a similar view of a slightly modified embodiment of the invention in which the rollers are set at an angle to the axis of the bearing, Fig. 3 is a view similar to Fig. 2 showing a bearing embodying two series of rollers mounted on a single inner bearing member, and Fig. 4 is a view similar to Fig. 2, showing rollers having a larger diameter at one end than at the other.

Fig. 1 illustrates an inner bearing member 1 that is convexly curved endwise, an outer bearing member 2 that is convexly curved endwise and rollers 3 interposed therebetween, each roller tapering from each end toward the middle, that is to say, each roller has the appearance of two truncated cones 4 joined together at their small ends. A suitable cage 5 is provided for the rollers. The rollers are arranged with their axes parallel to the axis of the bearing.

The convexly curved race portion of each bearing member makes point contact with each conical portion 4 of the rollers 3. Preferably, the radius of curvature R of the inner bearing member 1 is different from the radius of curvature R' of the outer bearing member; so that the circles 6 defined by the contact points of the inner bearing member 1 with the roller do not coincide with the corresponding circles 7 defined by the points of contact of the outer bearing member 2 with the roller, but said circles are located at different points on the length of the roller.

Figure 1:
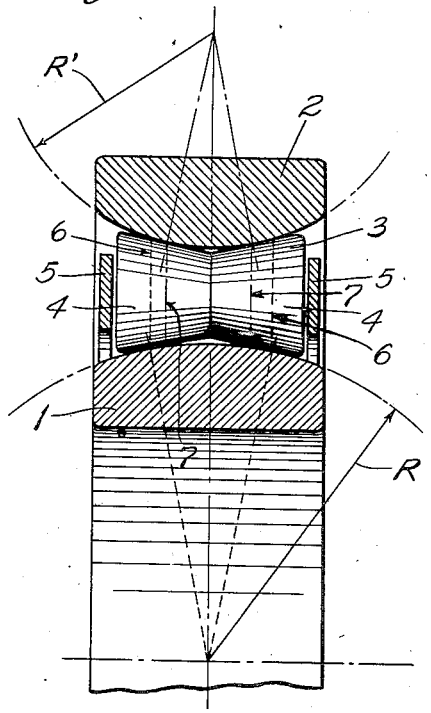
Figure 2:
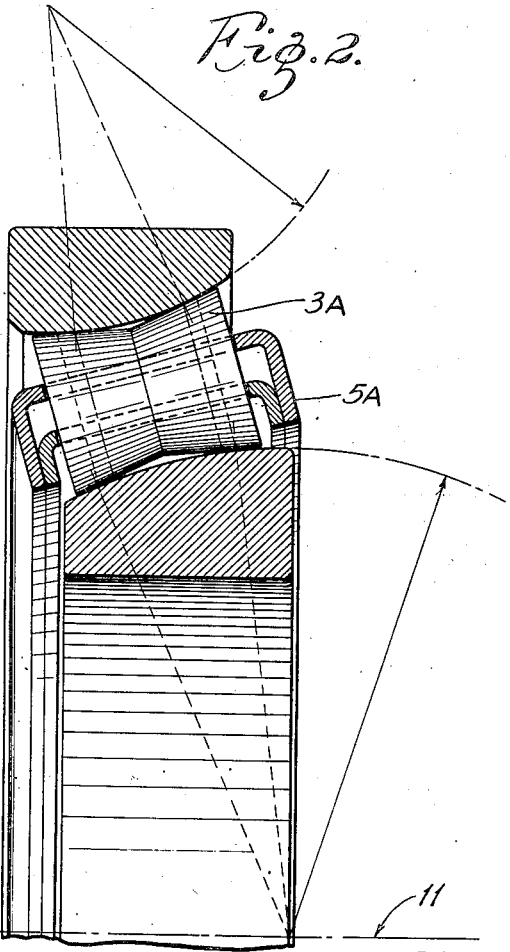
Fig. 2 shows a similar bearing in which the rollers 3A are disposed at an angle to the axis 11 of the bearing. This figure also illustrates a different form of cage 5A.
Figure 3:
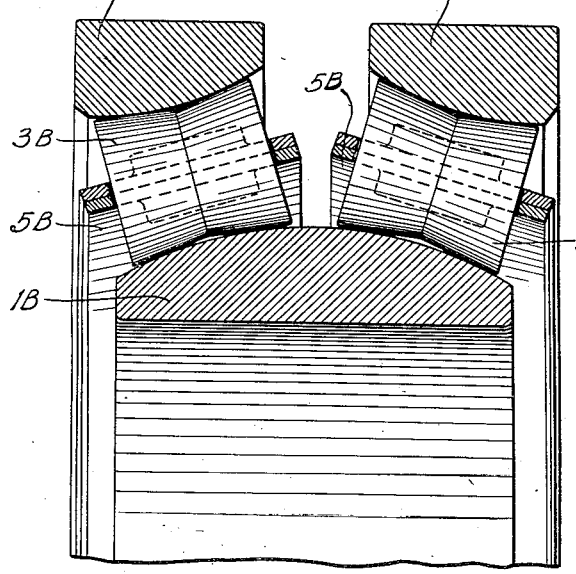
Fig. 3 shows a bearing in which two series of rollers 3B are mounted on a single inner bearing member 1B, separate outer bearing members 2B being provided for each series of rollers. A different form of cage 5B is provided for this bearing also.
Figure 4:
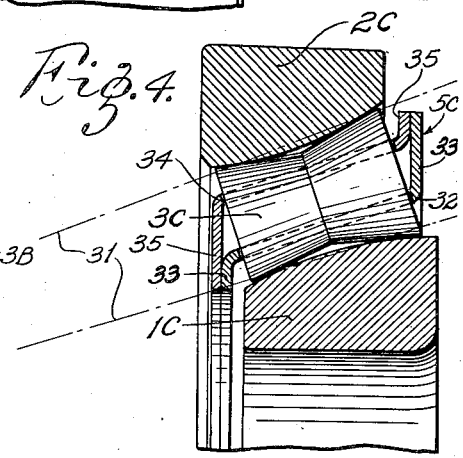

Fig. 4 shows a bearing in which the ends of the rollers 3C are of different diameters, thus having the characteristics of the ordinary conical roller as to true rolling and still being self aligning. Lines 31 through the contact points of the rollers with the inner and outer bearing members meet at the axis of the bearing. The inner bearing member 1C and the outer bearing member 2C are convexly curved as in the other constructions. The cage 5C comprises an inner shell 32 having end flanges 33 and an outer shell 34 also having end flanges 35, the two sets of end flanges abutting against each other.

The above described bearing is completely self aligning, it is simple and economical to manufacture, the desirable point contact is maintained, the location of the points of contact may be located at any desired position by changing the taper of the conical portions of the rollers or by changing the radius of curvature of the bearing member. The location of roller contact points near the ends of the rollers prevents tipping and skewing of the rollers, keeping the rollers in proper position and making the bearing run smoothly and quietly. The separation of the contact points of inner and outer members increases the guiding effect and distributes the wear on the rollers. The conical portions of the rollers and the cooperating curved race members enable the bearing to take up end thrust in each direction as well as to carry radial load. Obviously numerous changes may be made without departing from the invention and I do not wish to be limited to the precise construction shown.

What I claim is:

1. A roller bearing comprising an inner bearing member, an outer bearing member and rollers therebetween, said rollers tapering from their ends toward the middle and said bearing members making point contact with both tapering portions of said rollers, the points of contact of one race member being differently situated lengthwise of the rollers from the points of contact of the other race member.

2. A roller bearing comprising an inner bearing member convexly curved endwise, an outer bearing member convexly curved endwise and having a different degree of curvature, and rollers interposed therebetween, said rollers tapering from each end toward the middle.

3. A roller bearing comprising an inner bearing member convexly curved endwise, an outer bearing member convexly curved endwise and having a different degree of curvature, and rollers interposed therebetween, said rollers tapering from each end toward the middle and being disposed angularly with respect to the axis of the bearing.

4. A roller bearing comprising an inner bearing member convexly curved endwise, outer bearing members convexly curved endwise and having a different degree of curvature from that of the inner bearing members, and two series of rollers interposed therebetween, said rollers tapering from each end toward the middle and being disposed angularly with respect to the axis of the bearing.

5. A roller bearing comprising an inner bearing member convexly curved endwise, an outer bearing member convexly curved endwise and having a different degree of curvature, and rollers interposed therebetween, said rollers tapering from each end toward the middle and being disposed angularly with respect to the axis of the bearing, said rollers being smaller at one end than at the other.

Signed at Canton, Ohio, this 4 day of June, 1930.

WILLIAM L. SCRIBNER.